United States Patent
Kimura

(10) Patent No.: US 11,169,372 B2
(45) Date of Patent: Nov. 9, 2021

(54) LIGHT SCANNING APPARATUS AND METHOD FOR CONTROLLING LIGHT SCANNING APPARATUS

(71) Applicant: Yuji Kimura, Tokyo (JP)

(72) Inventor: Yuji Kimura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 162 days.

(21) Appl. No.: 16/782,507

(22) Filed: Feb. 5, 2020

(65) Prior Publication Data
US 2020/0271921 A1 Aug. 27, 2020

(30) Foreign Application Priority Data
Feb. 25, 2019 (JP) .............................. JP2019-031860

(51) Int. Cl.
*G02B 26/08* (2006.01)
*G02B 26/10* (2006.01)
(52) U.S. Cl.
CPC ....... *G02B 26/0858* (2013.01); *G02B 26/101* (2013.01)
(58) Field of Classification Search
CPC .. G02B 26/0858; G02B 26/101; G02B 26/10; G02B 26/08

USPC ....................................................... 359/224.1
See application file for complete search history.

(56) References Cited

U.S. PATENT DOCUMENTS

| 8,057,052 B2 | 11/2011 | Nishigaki et al. |
| 8,841,821 B2 | 9/2014 | Aimono |
| 2018/0095356 A1* | 4/2018 | Kimura ................. G02B 26/10 |

FOREIGN PATENT DOCUMENTS

| JP | 2009-258321 | 11/2009 |
| JP | 2012-198415 | 10/2012 |

* cited by examiner

*Primary Examiner* — Euncha P Cherry
(74) *Attorney, Agent, or Firm* — IPUSA, PLLC

(57) ABSTRACT

A light scanning apparatus includes a light source configured to output laser light, and a mirror configured to reflect the laser light from the light source. The light scanning apparatus includes a mirror driving unit configured to resonantly drive the mirror in a first direction and non-resonantly drive the mirror in a second direction, the second direction being perpendicular to the first direction. The light scanning apparatus includes a first sensor configured to output a signal in accordance with a first deflection angle at which the mirror is oriented with respect to the first direction. The light scanning apparatus includes a second sensor configured to output a signal in accordance with a second deflection angle at which the mirror is oriented with respect to the second direction.

7 Claims, 10 Drawing Sheets

LIGHT SCANNING APPARATUS AND METHOD FOR CONTROLLING LIGHT SCANNING APPARATUS

CROSS-REFERENCE TO RELATED APPLICATION

This application claims priority under 35 U.S.C. 5119 to Japanese Patent Application No. 2019-031860, filed Feb. 25, 2019, the contents of which are incorporated herein by reference in their entirety.

BACKGROUND OF THE INVENTION

1. Field of the Invention

The present disclosure relates to a light scanning apparatus and a method for controlling the light scanning apparatus.

2. Description of the Related Art

Light scanning apparatuses are known to bidimensionally scan with laser light, while causing a mirror to oscillate about a horizontal rotation axis and a vertical rotation axis. As such light scanning apparatuses, some light scanning apparatuses that resonantly drive in a horizontal direction, and that non-resonantly drive in a vertical direction are used. A drive voltage expressed as a sinusoidal waveform is used in resonant driving, and a drive voltage expressed as a sawtooth waveform is used in non-resonant driving (see Japanese Patent No. 5659056 which is hereinafter referred to as Patent document 1).

For such a light scanning apparatus, at start-up or the like of the light scanning apparatus, when a deflection angle by mirror oscillation is not sufficiently large, in a case of laser light being output to the mirror, the laser light with which the light scanning apparatus scans may be emitted to be concentrated in a narrow area. In light of the situation described above, when a deflection angle at which the mirror is oriented becomes sufficiently large, laser light is proposed to be output to a mirror (see Japanese Patent No. 4946964 which is hereinafter referred to as Patent document 2).

SUMMARY

According to disclosed techniques, a light scanning apparatus is provided, including: a light source configured to output laser light; a mirror configured to reflect the laser light from the light source; a mirror driving unit configured to resonantly drive the mirror in a first direction and non-resonantly drive the mirror in a second direction, the second direction being perpendicular to the first direction; a first sensor configured to output a signal in accordance with a first deflection angle at which the mirror is oriented with respect to the first direction; a second sensor configured to output a signal in accordance with a second deflection angle at which the mirror is oriented with respect to the second direction; a first deflection-angle determining unit configured to estimate the first deflection angle based on an output signal of the first sensor and determine whether the first deflection angle is in a predetermined range; a change-rate determining unit configured to calculate a change rate of an output signal of the second sensor and determine whether the change rate is in a predetermined range; and a laser output controller configured to control output of laser light from the light source, based on a result determined by the first deflection-angle determining unit and the change-rate determining unit.

DESCRIPTION OF THE EMBODIMENTS

Related art information relevant to the present disclosure recognized by the inventor will be provided below. A light scanning apparatus described in Patent document 2 resonantly drives a mirror in a horizontal direction and a vertical direction. Such a light scanning apparatus is not an apparatus in which diving is resonant in a horizontal direction and non-resonant in a vertical direction, as described in a light scanning apparatus in Patent document 1.

In general, with respect to non-resonant driving in accordance with a sawtooth drive voltage, a cycle during which a mirror oscillates is longer than that with respect to resonant driving in accordance with a sinusoidal drive voltage. Because detected data for one cycle is required to estimate a deflection angle, a process time to determine that a deflection angle with respect to non-resonant driving is not sufficiently large is increased, compared to a case of resonant driving. For this reason, output of laser light could not easily begin or stop with proper timing. For example, in control in accordance with a deflection angle, while a light scanning apparatus operates, in a case of non-resonant driving being interrupted for a certain failure, output of laser light could not be promptly interrupted.

In light of the situation described above, techniques in the present disclosure provide a light scanning apparatus in which driving is resonant in a horizontal direction and non-resonant in a vertical direction, thereby promoting safety.

First Embodiment

Figure 1:
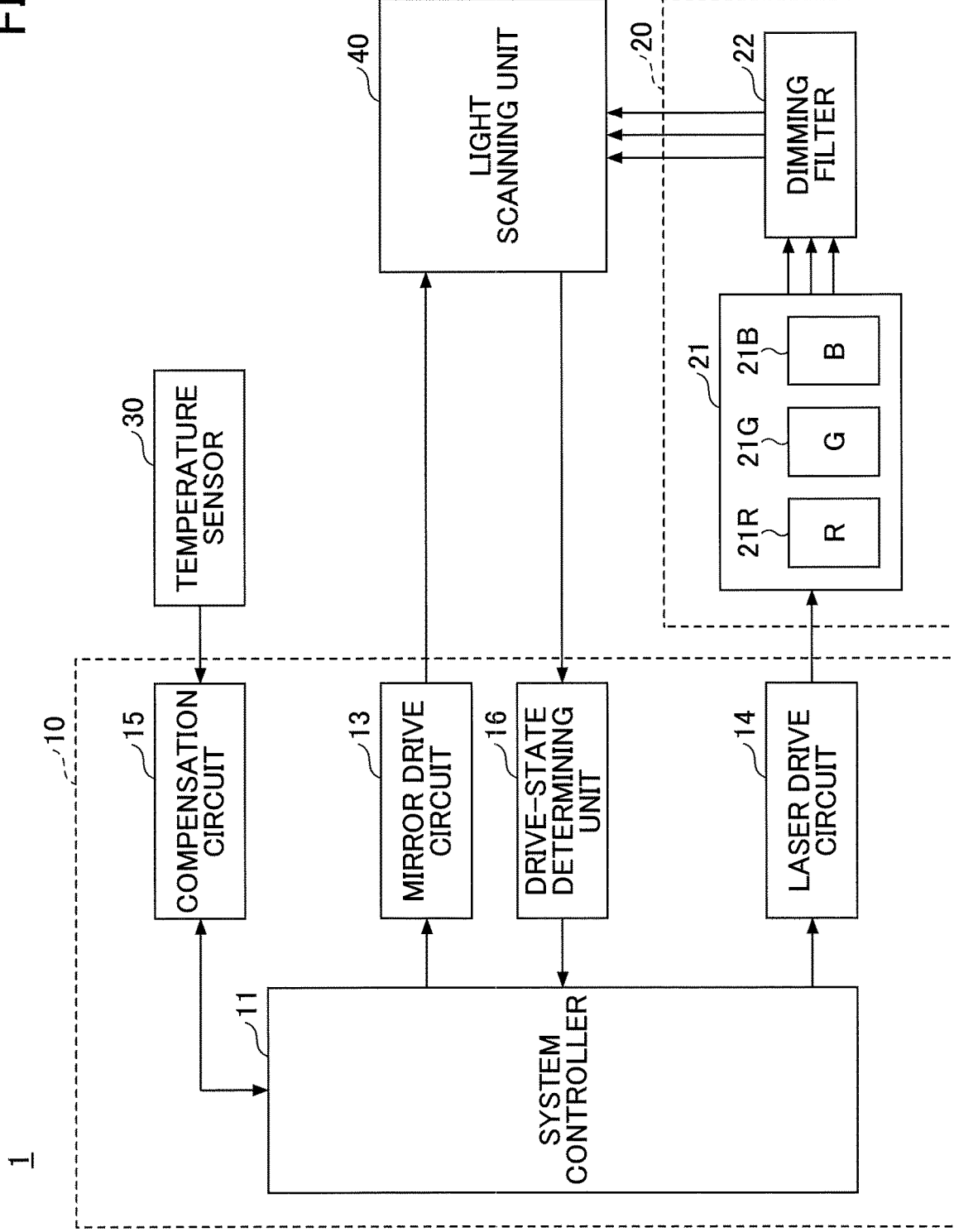
FIG. 1 is a diagram illustrating an example of a configuration of a light scanning apparatus according to a first embodiment.

A first embodiment will be hereinafter described with reference to the drawings. FIG. 1 is a diagram illustrating an example of a configuration of a light scanning apparatus according to the first embodiment.

In the present embodiment, the light scanning apparatus 1 includes a light scanning controller 10, a light source 20, a temperature sensor 30, and a light scanning unit 40. Each component will be described below.

The light scanning controller 10 includes a system controller 11; a mirror drive circuit 13; a laser drive circuit 14; a compensation circuit 15; and a drive-state determining unit 16. The light scanning controller 10 controls the light source 20 and the light scanning unit 40.

The system controller 11 supplies, to the mirror drive circuit 13, a control signal for controlling oscillating of a mirror of the light scanning unit 40. Further, the system controller 11 supplies a digital video signal to the laser drive circuit 14.

The mirror drive circuit 13 is a mirror drive unit that supplies a horizontal drive signal and a vertical drive signal to the light scanning unit 40, based on a control signal from the system controller 11. Where, the horizontal drive signal is for driving the mirror described below in a horizontal direction to cause the mirror to oscillate about a horizontal oscillation-axis, and the vertical drive signal is for driving the mirror in a vertical direction to cause the mirror to oscillate about a vertical oscillation-axis.

The laser drive circuit 14 supplies a laser drive signal for driving a laser, to the light source 20, based on a video signal from the system controller 11.

The compensation circuit 15 compensates for a phase shift with respect to a horizontal direction caused in accordance with a vertical position of the mirror that is driven in the vertical direction through the light scanning unit 40. The phase shift with respect to the horizontal direction is caused by a shift from a horizontal resonant frequency to a horizontal drive frequency at which the mirror 110 is driven in a horizontal direction. When there is a phase shift with respect to a horizontal direction, in a case of scanning with laser light with respect to a horizontal direction, displacement of a start position (or end position) of irradiation in a forward path, from an end position (or start position) of irradiation in a backward path occurs, so that a projected image deteriorates.

The compensation circuit 15 may compensate using a predetermined fixed value in accordance with a vertical position. Alternately, the compensation circuit 15 may compensate by calculating a value expressing a phase shift, during driving of the mirror.

The drive-state determining unit 16 determines a drive state of the mirror 110, based on output signals (detected signals) from a second sensor and a first sensor that are included in the light scanning unit 40. The system controller 11 controls laser output of the light source 20, based on a determined result about a drive state of the mirror, the result being obtained by the drive-state determining unit 16.

The light source 20 includes an LD (laser diode) module 21 and a dimming filter 22. The LD module 21 includes a laser 21R, a laser 21G, and a laser 21B.

The lasers 21R, 21G, and 21B emit laser light based on a laser drive current applied from the system controller 11.

The laser 21R is, for example, a red semiconductor laser that emits light having a wavelength λR (e.g., 640 nm). The laser 21G is, for example, a green semiconductor laser that emits light having a wavelength λG (e.g., 530 nm). The laser 21G is, for example, a blue semiconductor laser that emits light having a wavelength λB (e.g., 445 nm). Respective lights having wavelengths emitted from the lasers 21R, 21G, and 21B are synthesized by a dichroic mirror or the like. Then, a synthesized light is dimmed by a dimming filter 22 to have a predetermined light amount, and enters the light scanning unit 40.

The temperature sensor 30 is a sensor for detecting a temperature in the surroundings of the light scanning apparatus 1. For example, the temperature sensor 30 may be taken as a thermistor or the like.

The light scanning unit 40 drives a mirror in a horizontal direction and a vertical direction, in accordance with a horizontal drive signal and a vertical drive signal that are supplied by the mirror drive circuit 13. In such a manner, the light scanning unit 40 varies a direction of light reflected with respect to emitted laser light, while scanning with laser light. Thereby, the light scanning unit 40 projects an image on a screen or the like.

Figure 2:
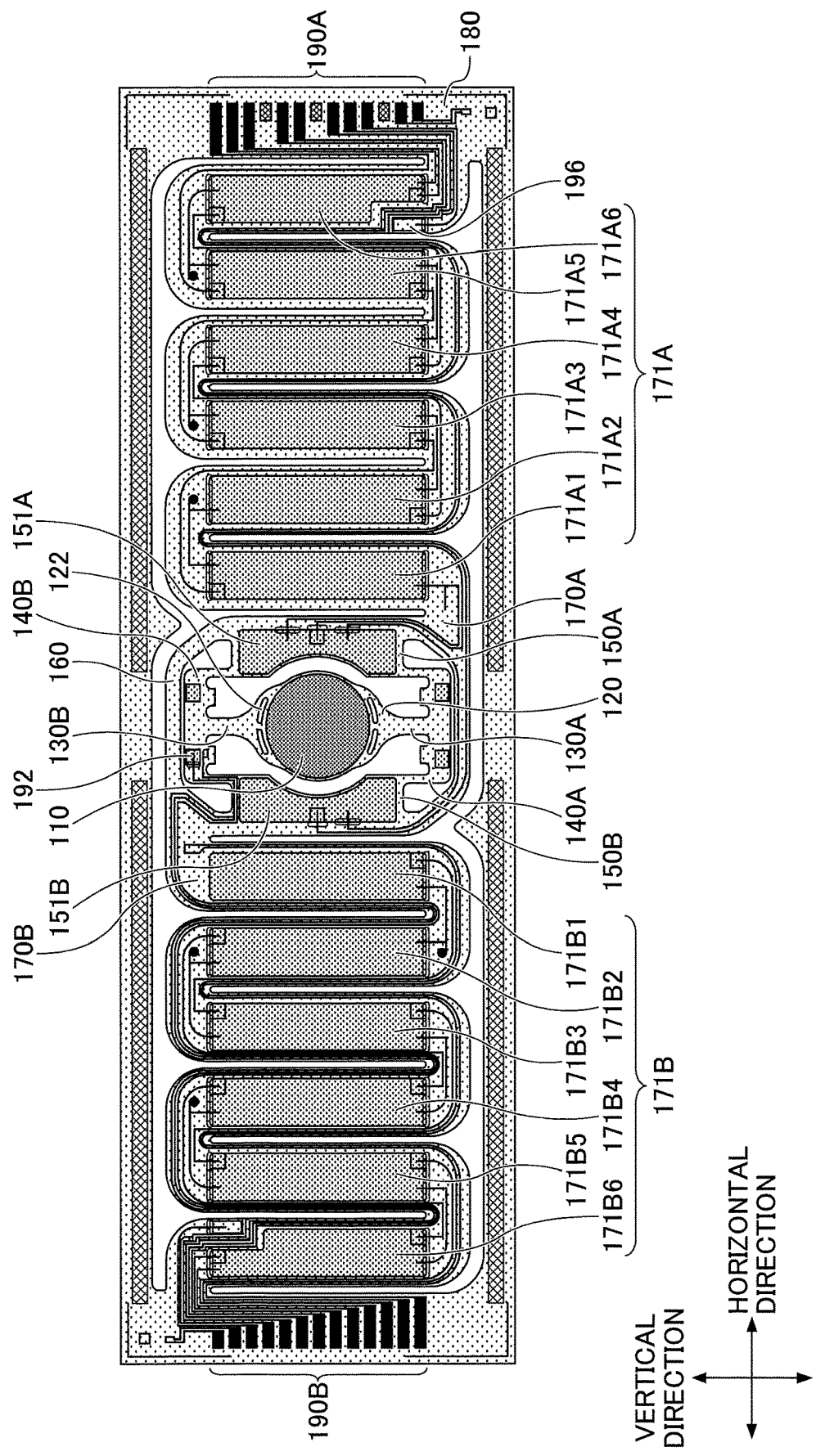
FIG. 2 is a diagram illustrating an example of a light scanning unit.

FIG. 2 is a diagram illustrating an example of a configuration of the light scanning unit 40. The light scanning unit 40 is a MEMS (microelectromechanical system) that drives the mirror 110 by a piezoelectric element, for example.

The light scanning unit 40 includes the mirror 110; a mirror support 120; torsion beams 130A and 130B; and connection beams 140A and 140B. Further, the light scanning unit 40 includes first drive beams 150A and 150B; a movable frame 160; second drive beams 170A and 170B; and a fixing frame 180. The first drive beams 150A and 150B include drive sources 151A and 151B, respectively. The second drive beams 170A and 170B include drive sources 171A and 171B, respectively. The first drive beams 150A and 150B, as well as the second drive beams 170A and 170B, serve as an actuator that causes the mirror 110 to oscillate up and down or left and right, and that scans with laser light.

Each slit 122 is formed in the mirror support 120, so as to be along an outer periphery of the mirror 110. Each slit 122 can transfer torsion of the torsion beams 130A and 130B to the mirror 110, as well as allowing for reductions in weight of the mirror support 120.

In the light scanning unit 40, the mirror 110 is supported on an upper surface of the mirror support 120. The mirror support 120 is connected at ends of the torsion beams 130A and 130B that are on both sides of the mirror support 120. The torsion beams 130A and 130B serve as an oscillation axis. The torsion beams 130A and 130B extend in an axial direction, and support the mirror support 120 at opposite sides of the axial direction. In accordance with torsion of the torsion beams 130A and 130B, the mirror 110 supported by the mirror support 120 oscillates, while performing operation to scan with light reflected by the mirror 110. The torsion beams 130A and 130B are coupled with the connection beams 140A and 140B, respectively, so as to be supported by the connection beams 140A and 140B. The torsion beams 130A and 130B are respectively connected to the first drive beams 150A and 150B, via the connection beams 140A and 140B.

The first drive beams 150A and 150B, the connection beams 140A and 140B, the torsion beams 130A and 130B, the mirror support 120, and the mirror 110 are each outwardly supported by the movable frame 160. One side of each of the first drive beams 150A and 150B is supported by the movable frame 160. The other side of the first drive beam 150A extends inward and is connected to the connection beams 140A and 140B. Similarly, the other side of the first drive beam 150B extends inward and is connected to the connection beams 140A and 140B.

The first drive beams 150A and 150B are paired so as to interpose the mirror 110 and the mirror support 120, in a direction perpendicular to the torsion beams 130A and 130B. The drive sources 151A and 151B are formed on upper surfaces of the first drive beams 150A and 150B, respectively. Each of the drive sources 151A and 151B includes an upper electrode that is formed on a thin film (hereafter referred to as "a piezoelectric thin film") of a piezoelectric element on an upper surface of a corresponding first drive beam from among the first drive beams 150A and 150B, and includes a lower electrode formed on a lower surface of the piezoelectric thin film. Each of the drive sources 151A and 151B extends or contracts in accordance with drive voltages applied to a corresponding upper electrode and a corresponding lower electrode.

In such a manner, when drive voltages set at reversed polarities are alternately applied between the first drive beam 150A and the first drive beam 150B, the first drive beam 150A and the first drive beam 150B alternately vibrate vertically in opposite directions, on right and left sides of the mirror 110. Thereby, the mirror 110 can oscillate about an axis being an oscillation axis or a rotation axis that is served by the torsion beams 130A and 130B.

A direction of the mirror 110 oscillating about an axis served by the torsion beams 130A and 130B is hereafter referred to as a horizontal direction. In the present embodiment, by deforming the torsion beams 130A and 130B, the first drive beam 150A and the first drive beam 150B cause the mirror 110 to oscillate in a horizontal direction (first direction). For example, a resonant vibration is used in horizontal driving through the first drive beams 150A and 150B. In this case, the mirror 110 can be driven to oscillate at a high speed.

One end of each of the second drive beams 170A and 170B is connected to an outer portion of the movable frame 160. The second drive beams 170A and 170B are paired so as to interpose the movable frame 160 at both sides of the movable frame. The second drive beams 170A and 170B support the movable frame 160 at both sides of the movable frame, and cause the movable frame 160 to oscillate about a predetermined axis that passes through the center of a surface on which light is reflected. The second drive beam 170A has a zigzag shape as a whole in which each of multiple (e.g., even number) rectangular beams extending parallel to the first drive beam 150A is connected at ends of adjacent rectangular beams.

The other end of the second drive beam 170A is connected to the inside of the fixing frame 180. Similarly, the second drive beam 170B has a zigzag shape as a whole in which each of multiple (e.g., even number) rectangular beams extending parallel to the first drive beam 150B is connected at ends of adjacent rectangular beams. The other end of the second drive beam 170B is connected to the inside of the fixing frame 180.

The drive sources 171A and 171B are respectively formed on upper surfaces of the second drive beams 170A and 170B, each of which includes rectangular units each not including a curved portion. The drive source 171A includes an upper electrode that is formed on a piezoelectric thin film on an upper surface of the second drive beam 170A, and includes a lower electrode formed on a lower surface of the piezoelectric thin film. The drive source 171B includes an upper electrode formed on a piezoelectric thin film on an upper surface of the second drive beam 170B, and includes a lower electrode formed on a lower surface of the piezoelectric thin film.

With respect to the second drive beams 170A and 170B, when drive voltages set at reversed polarities are respectively applied to the drive sources 171A and 171B each of which includes adjacent rectangular units, the adjacent rectangular beams deflect vertically in opposite directions. Thereby, the resultant force caused by the vertically deflected rectangular beams is applied to the movable frame 160.

With such a force being applied, the second drive beams 170A and 170B cause the mirror 110 to oscillate in a vertical direction perpendicular to the horizontal direction. In this example, the second drive beams 170A and 170B serve as vertical beams that cause the mirror 110 to oscillate in the vertical direction. In other words, in the present embodiment, with the second drive beams 170A and 170B bending and deforming, the mirror 110 oscillates in the vertical direction (second direction). For example, a non-resonant vibration is used in vertical driving through the second drive beams 170A and 170B.

The drive source 171A includes drive sources 171A1, 171A2, 171A3, 171A4, 171A5, and 171A6 that are disposed in this order toward a right direction with respect to the movable frame 160. Further, the drive source 171B includes drive sources 171B1, 171B2, 171B3, 171B4, 171B5, and 171B6 that are disposed in this order toward a left direction with respect to the movable frame 160.

Drive interconnects for applying drive voltages to the upper electrode and the lower electrode of the drive source 151A are connected to predetermined terminals included in a terminal group 190A that is disposed in the fixing frame 180. Drive interconnects for applying drive voltages to the upper electrode and the lower electrode of the drive source 151B are connected to predetermined terminals included in a terminal group 190B that is disposed in the fixing frame 180. Further, drive interconnects for applying driving voltages to the upper electrode and the lower electrode of the drive source 171A are connected to predetermined terminals included in the terminal group 190A that is disposed in the fixing frame 180. Driving interconnects for applying drive voltages to the upper electrode and the lower electrode of the drive source 171B are connected to predetermined terminals included in the terminal group 190B that is disposed in the fixing frame 180.

The light scanning unit 40 includes a first sensor 192. The first sensor 192 outputs a signal in accordance with a deflection angle at which the mirror 110 is oriented with respect to the horizontal direction, when drive voltages are applied to the drive sources 151A and 151B so that the mirror 110 thereby oscillates in the horizontal direction. The first sensor 192 includes a piezoelectric sensor, and is disposed in the connection beam 140B.

The light scanning unit 40 includes a second sensor 196. The second sensor 196 outputs a signal in accordance with a deflection angle at which the mirror 110 is oriented with respect to the vertical direction, when drive voltages are applied to the drive sources 171A and 171B so that the mirror 110 thereby oscillates in the vertical direction. The second sensor 196 includes a piezoelectric sensor, and is disposed in a given one rectangular beam in the second drive beam 170B.

In accordance with the mirror 110 being oriented with respect to the horizontal direction, the first sensor 192 outputs a signal corresponding to displacement of the connection beam 140B, the displacement being transferred by the torsion beam 130B. The second sensor 196 outputs a signal corresponding to displacement of a given rectangular beam in which the second sensor 196 is disposed and which is disposed in the second drive beam 170A.

A piezoelectric sensor used as each of the first sensor 192 and the second sensor 196 includes an upper electrode that is formed on an upper surface of a piezoelectric thin film, and includes a lower electrode formed on a lower surface of the piezoelectric thin film. Sensor interconnects drawn from the upper electrode and the lower electrode of a piezoelectric sensor used as the first sensor 192 are connected to predetermined terminals included in the terminal group 190B that is disposed in the fixing frame 180. Further, sensor interconnects drawn from the upper electrode and the lower electrode of a piezoelectric sensor used as the second sensor 196 are connected to predetermined terminals included in the terminal group 190A that is disposed in the fixing frame 180.

Figure 3:
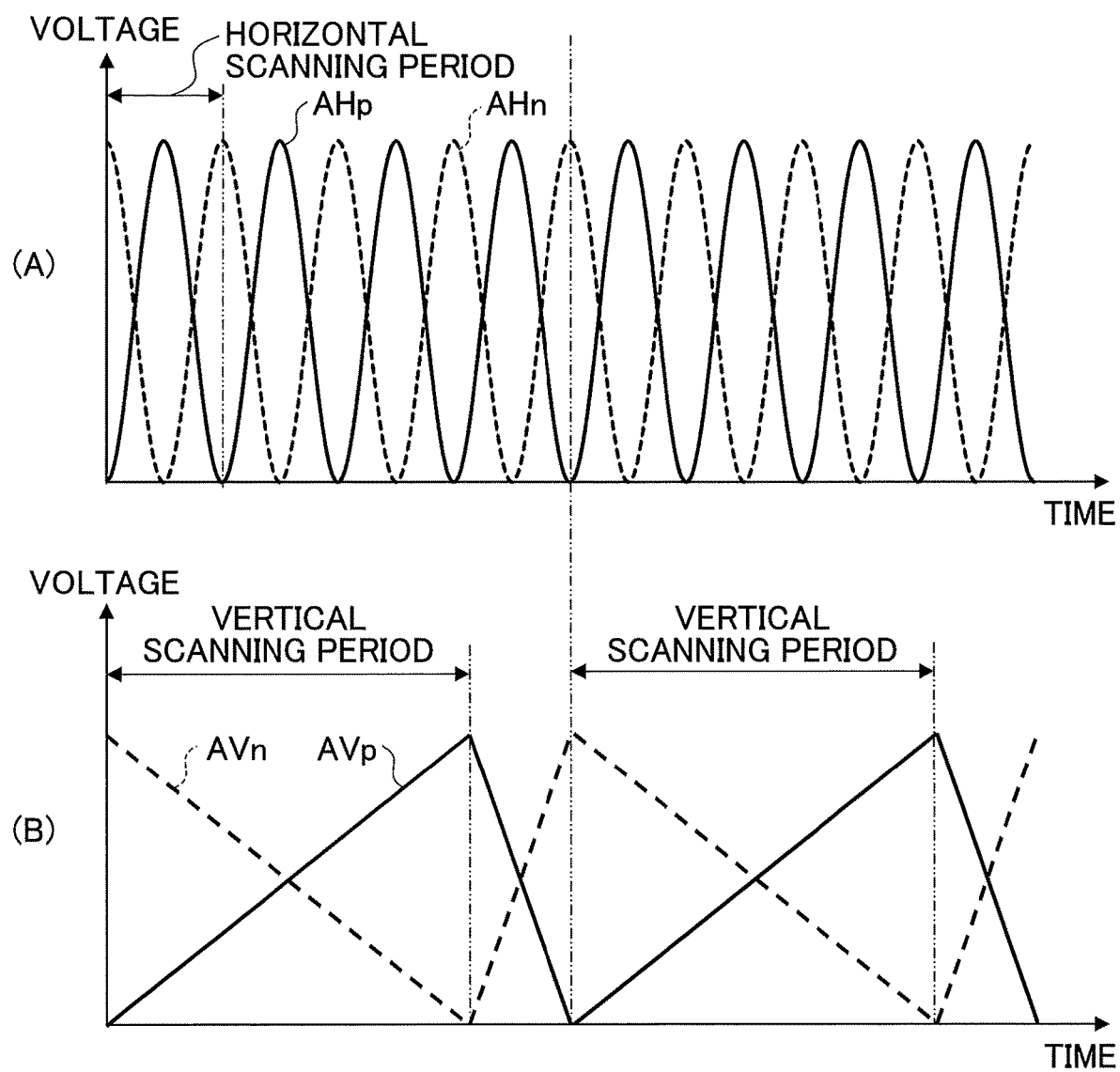
FIG. 3 is a diagram illustrating an example of a horizontal drive signal and a vertical drive signal.

FIG. 3 is a diagram illustrating an example of a horizontal drive signal and a vertical drive signal that are generated by the mirror drive circuit 13. FIG. 3(A) illustrates an example of a horizontal drive signal. FIG. 3(B) illustrates an example of a vertical drive signal.

The horizontal drive signal includes a first horizontal drive signal AHp that is applied to the drive source 151A, and includes a second horizontal drive signal AHn that is applied to the drive source 151B. For example, the first horizontal drive signal AHp and the second horizontal drive signal AHn are expressed as sinusoidal waveforms each having a same cycle and amplitude. The second horizontal drive signal AHn is out of phase by a half cycle, with respect to the first horizontal drive signal AHp. In other words, the first horizontal drive signal AHp and the second horizontal drive signal AHn are set at reversed potentials with respect to a midpoint potential.

In accordance with a potential difference between the first horizontal drive signal AHp and the second horizontal drive signal AHn, the mirror 110 is driven to oscillate in the horizontal direction. A deflection angle at which the mirror 110 is oriented with respect to the horizontal direction corresponds to amplitudes for the first horizontal drive signal AHp and the second horizontal drive signal AHn.

The vertical drive signal includes a first vertical drive signal AVp that is applied to the drive source 171A, and includes a second vertical drive signal AVn that is applied to the drive source 171B. For example, the first vertical drive signal AVp and the second vertical drive signal AVn are expressed as sawtooth waveforms each having a same cycle and amplitude. The first vertical drive signal AVp and the second vertical drive signal AVn are set at reversed potentials with respect to a midpoint potential.

In accordance with a potential difference between the first vertical drive signal AVp and the second vertical drive signal AVn, the mirror 110 is driven to oscillate in the vertical direction. A deflection angle at which the mirror 110 is oriented with respect to the vertical direction corresponds to amplitudes for the first vertical drive signal AVp and the second vertical drive signal AVn.

Figure 4:
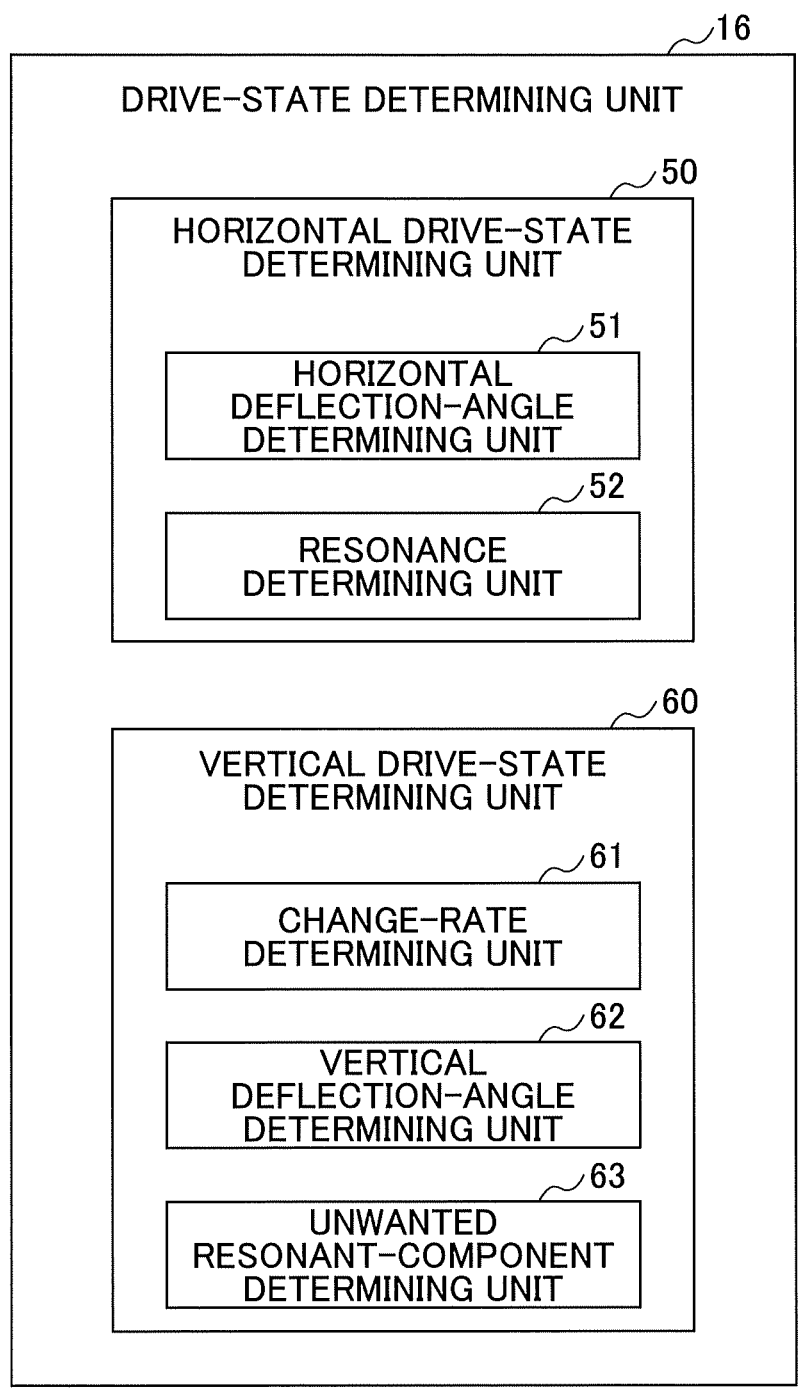
FIG. 4 is a diagram illustrating an example of a configuration of a drive-state determining unit.

Next, a configuration of the drive-state determining unit 16 will be described. FIG. 4 is a diagram illustrating an example of the configuration of the drive-state determining unit 16. The drive-state determining unit 16 includes a horizontal drive-state determining unit 50 and a vertical drive-state determining unit 60. The drive-state determining unit 16 may be implemented by any of hardware, software, and a combination thereof.

The horizontal drive-state determining unit 50 includes a horizontal deflection-angle determining unit 51 and a resonance determining unit 52. The vertical drive-state determining unit 60 includes a change-rate determining unit 61, a vertical deflection-angle determining unit 62, and an unwanted resonant-component determining unit 63.

The horizontal deflection-angle determining unit 51 estimates a deflection angle θ (horizontal deflection angle) at which the mirror 110 is oriented with respect to the horizontal direction, based on an output signal SH from the first sensor 192. Further, the horizontal deflection-angle determining unit 51 determines whether the deflection angle θ is in a predetermined range. The output signal SH is a signal expressing a deflection angle at which the mirror 110 is oriented with respect to the horizontal direction.

Figure 5:
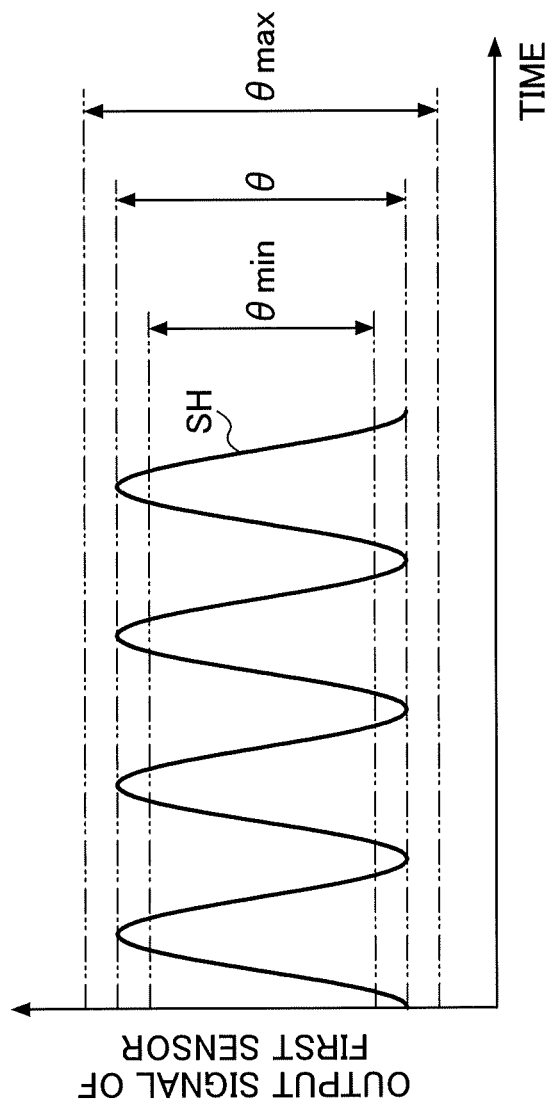
FIG. 5 is a diagram illustrating an example of an output signal of a first sensor.

FIG. 5 is a diagram illustrating an example of an output signal SH of the first sensor 192. As illustrated in FIG. 5, a deflection angle θ is expressed by a value corresponding to a difference between a maximum value and a minimum value of an output signal SH. The horizontal deflection-angle determining unit 51 may detect a deflection angle θ based on an output signal SH set in at least one cycle.

Specifically, when a detected deflection angle θ is in a range of from a lower limit θmin to an upper limit θmax, the horizontal deflection-angle determining unit 51 determines the deflection angle θ is normal. In contrast, when a deflection angle θ is out of the range, the horizontal deflection-angle determining unit 51 determines that the deflection angle θ is abnormal.

The resonance determining unit 52 determines whether a phase difference between a horizontal drive signal, which is supplied to the light scanning unit 40 by the mirror drive circuit 13, and an output signal SH of the first sensor 192 indicates a value corresponding to 90 degrees. Thereby, the resonance determining unit 52 determines whether the mirror 110 resonates in the horizontal direction.

Figure 6:
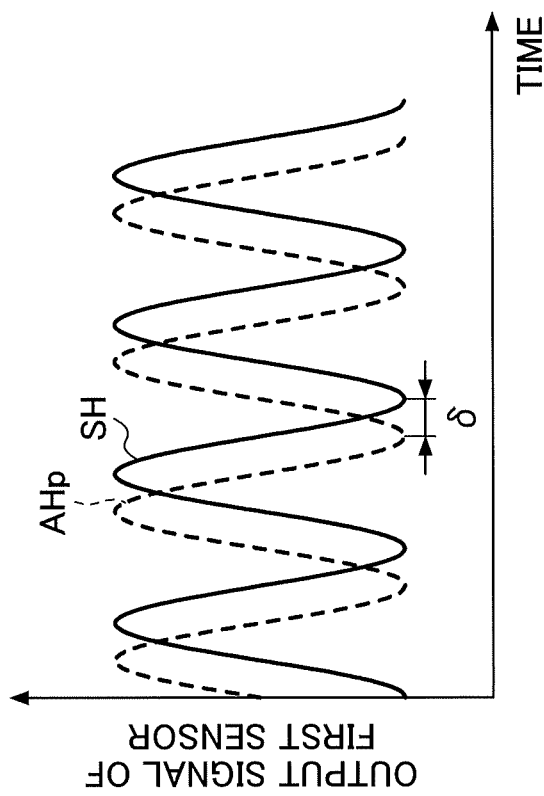
FIG. 6 is a diagram illustrating an example of a first horizontal drive signal and the output signal of the first sensor.

FIG. 6 is a diagram illustrating an example of a first horizontal drive signal AHp and an output signal SH of the first sensor 192. For example, the resonance determining unit 52 calculates a time difference δ between the first horizontal drive signal AHp and the output signal SH of the first sensor 192. When the time difference δ indicates a value (1/(4fh), where fh denotes a frequency) corresponding to a phase difference of 90 degrees, the resonance determining unit 52 determines that the mirror 110 is in a state (normal) of driving being resonant in the horizontal direction.

The change-rate determining unit 61 calculates a change rate R of an output signal SV, based on the output signal SV from the second sensor 196. Further, the change-rate determining unit 61 determines whether the change rate R is in a predetermined range. The output signal SV is a signal expressing a deflection angle at which the mirror 110 is oriented with respect to the vertical direction.

Figure 7:
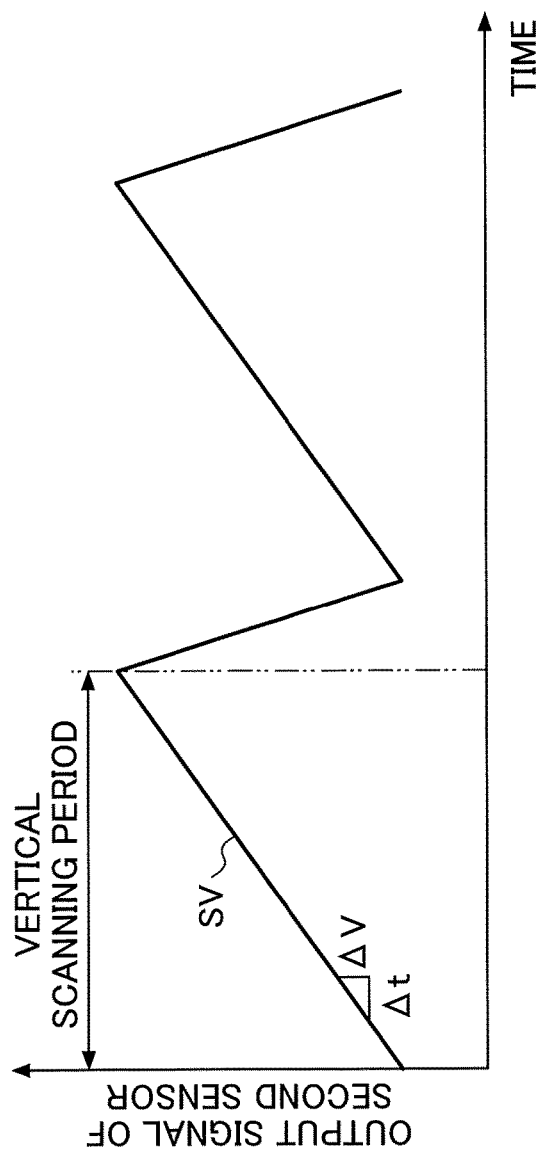
FIG. 7 is a diagram illustrating an example of an output signal of a second sensor.

FIG. 7 is a diagram illustrating an output signal SV of the second sensor 196. A change rate R indicates a change amount ΔV in an output signal SV for a minute time Δt, i.e., a derivative value (ΔV/Δt).

The change-rate determining unit 61 calculates a change rate for each minute time Δt. Further, the change-rate determining unit 61 determines that a change rate R is normal when the change rate R is in a predetermined range. In contrast, when a change rate R is out of a predetermined range, the change-rate determining unit 61 determines that the change rate R is abnormal. Note that in making such determination, the change-rate determining unit 61 calculates a change rate R in at least a vertical scanning period. With respect to a vertical drive signal, a slope in a vertical scanning period is different from a slope in a period out of the vertical scanning period. For this reason, the change-rate determining unit 61 changes a predetermined range as a reference for determination, in calculating and determining a change rate R in a period out of a vertical scanning period.

The vertical deflection-angle determining unit 62 estimates a deflection angle φ (vertical deflection angle) at which the mirror 110 is oriented with respect to the vertical direction, based on an output signal SV of the second sensor 196. Further, the vertical deflection-angle determining unit 62 determines whether the deflection angle φ is in a range.

Figure 8:
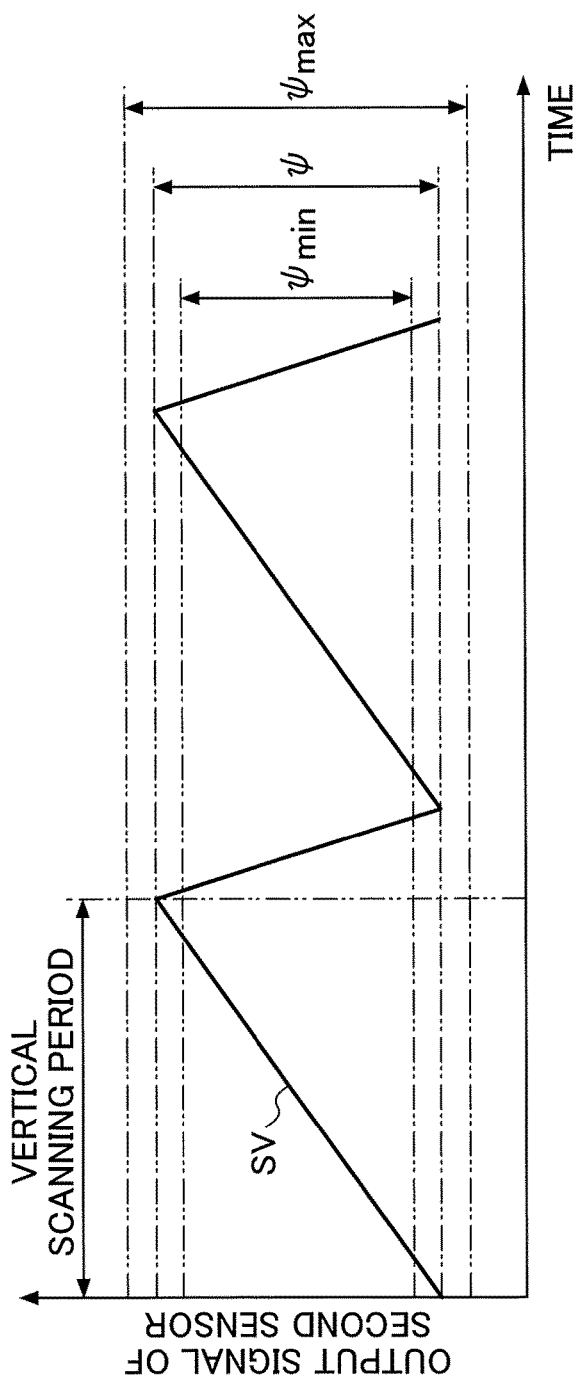
FIG. 8 is a diagram illustrating an example of an output signal of the second sensor.

FIG. 8 is a diagram illustrating an example of an output signal SV of the second sensor 196. As illustrated in FIG. 8, a deflection angle φ is expressed by a value corresponding to a difference between a maximum value and a minimum value of the output signal SV. The vertical deflection-angle determining unit 62 may estimate a deflection angle φ based on an output signal SV set in at least one cycle.

Specifically, the deflection-angle determining unit 62 determines a deflection angle φ is normal when a detected deflection angle φ is in a range of from a lower limit φmin to an upper limit (max. When a detected deflection angle φ is not in the range, the deflection-angle determining unit 62 determines that the deflection angle φ is abnormal.

The unwanted resonant-component determining unit 63 extracts an unwanted resonant component from a movement waveform of the mirror 110 in the vertical direction. Further, the unwanted resonant-component determining unit 63 determines whether the unwanted resonant component is smaller than or equal to a predetermined value. The unwanted resonant component is referred to as a resonant component at which the mirror 110 oscillates about a vertical-oscillation axis, i.e., a component causing ringing. When ringing occurs, an image displayed using a light scanning apparatus 1 shows a horizontal stripe and thus image quality is decreased.

Figure 9:
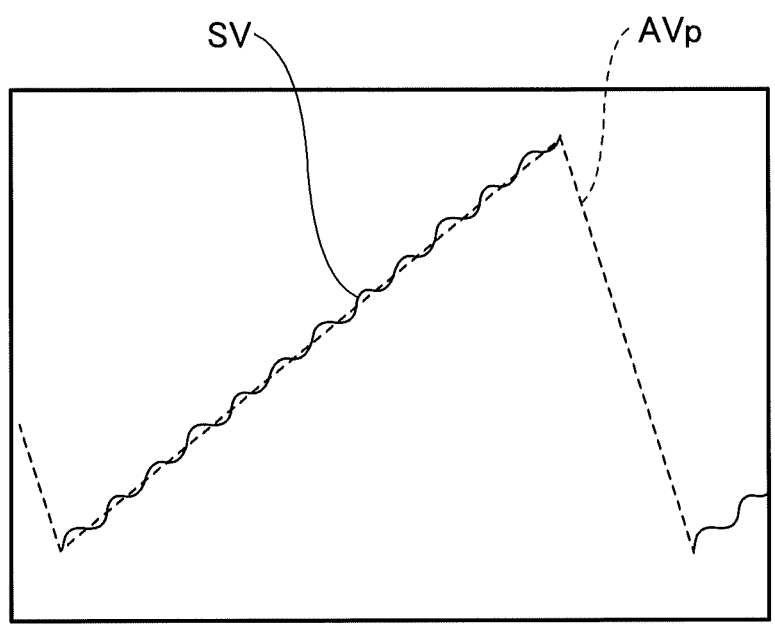
FIG. 9 is a diagram illustrating an example of a first vertical drive signal and an output signal of the second sensor in a case of an unwanted resonant component being superimposed on the output signal.

FIG. 9 is a diagram illustrating a first vertical drive signal AVp and an output signal SV of the second sensor 196 in a case of an unwanted resonant component being superimposed.

Figure 10:
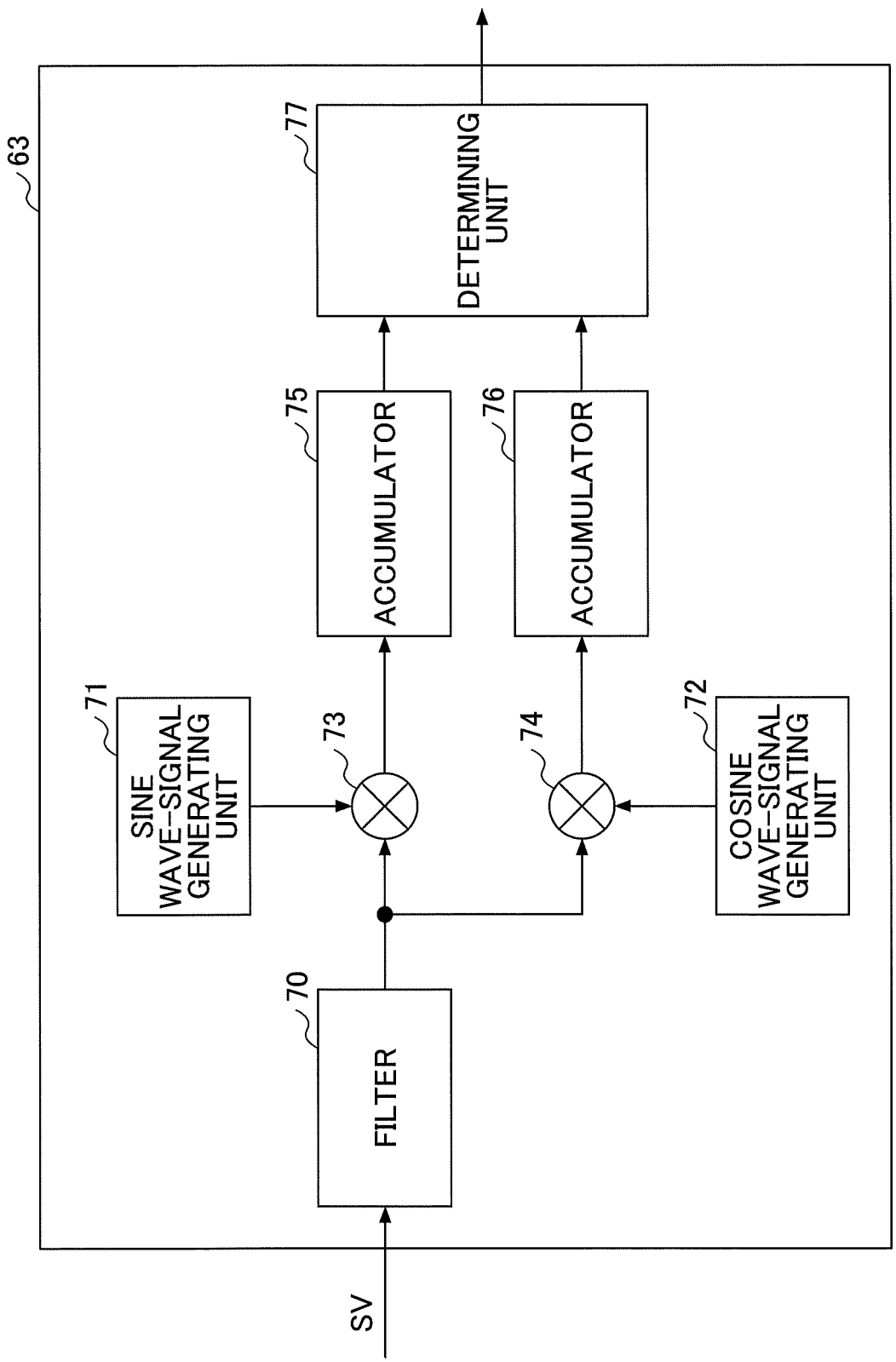
FIG. 10 is a diagram illustrating an example of a specific configuration of an unwanted resonant-component determining unit.

FIG. 10 is a diagram illustrating an example of a specific configuration of the unwanted resonant-component determining unit 63. The unwanted resonant-component determining unit 63 includes a filter 70; a sine wave-signal generating unit 71; a cosine wave-signal generating unit 72; multipliers 73 and 74; accumulators 75 and 76; and a determining unit 77.

The filter 70 filters an output signal SV of the second sensor 196 and thus outputs a detected signal S having an unwanted resonant component. For example, the filter 70 filters an output signal SV of the second sensor 196 with a low-pass filter or a bandpass filter, such that components other than an unwanted resonant component are attenuated.

The sine wave-signal generating unit 71 generates a sine wave signal (sin wave), which is one of periodic signals each of which is at one or more frequencies that are the same as or close to a frequency of an unwanted resonant component. The cosine wave-signal generating unit 72 generates a cosine wave signal (cos wave), which is one of periodic signals each of which is at one or more frequencies that are the same as or close to a frequency of an unwanted resonant component.

The multiplier 73 multiplies a sine wave by a detected signal S, and outputs a product of the sine wave signal and the detected signal S.

The accumulator 75 accumulates products output from the multiplier 73, and outputs an accumulated value as a first correlation value. The accumulator 76 accumulates products output from the multiplier 74, and outputs an accumulated value as a second correlation value. Respective accumulated values calculated by the accumulators 75 and 76 are reset for each drive cycle T of a sawtooth vertical drive signal.

When both of a first correlation value and a second correlation value are smaller than or equal to predetermined thresholds, the determining unit 77 determines that an unwanted resonant component is smaller than or equal to a predetermined value (normal). When at least one of a first correlation value and a second correlation value is greater than a predetermined threshold, the determining unit 77 determines that an unwanted resonant component is greater than a predetermined value (abnormal).

Figure 11:
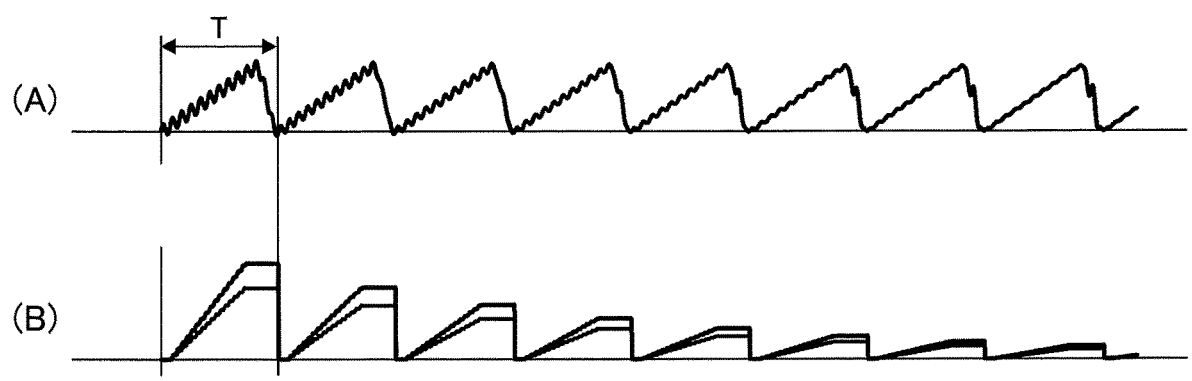
FIG. 11 is a diagram illustrating an example of a waveform which is expressed by movement of a mirror in a vertical direction and on which an unwanted resonant component is superimposed; and first and second correlation values.

FIG. 11(A) is a diagram illustrating an example of a change in a movement waveform of the mirror 110 in the vertical direction, for each one drive cycle T, where an unwanted resonant component is superimposed on the movement waveform. FIG. 11(B) is a diagram illustrating an example of a change in a first correlation value and a second correlation value, for each one drive cycle T. In this example, the first correlation value and the second correlation value calculated by the accumulators 75 and 76 are decreased in accordance with reductions in unwanted resonant components.

Hereafter, a laser output control of the light source 20 achieved by the system controller 11 will be described. The system controller 11 serves as a laser output controller.

Figure 12:
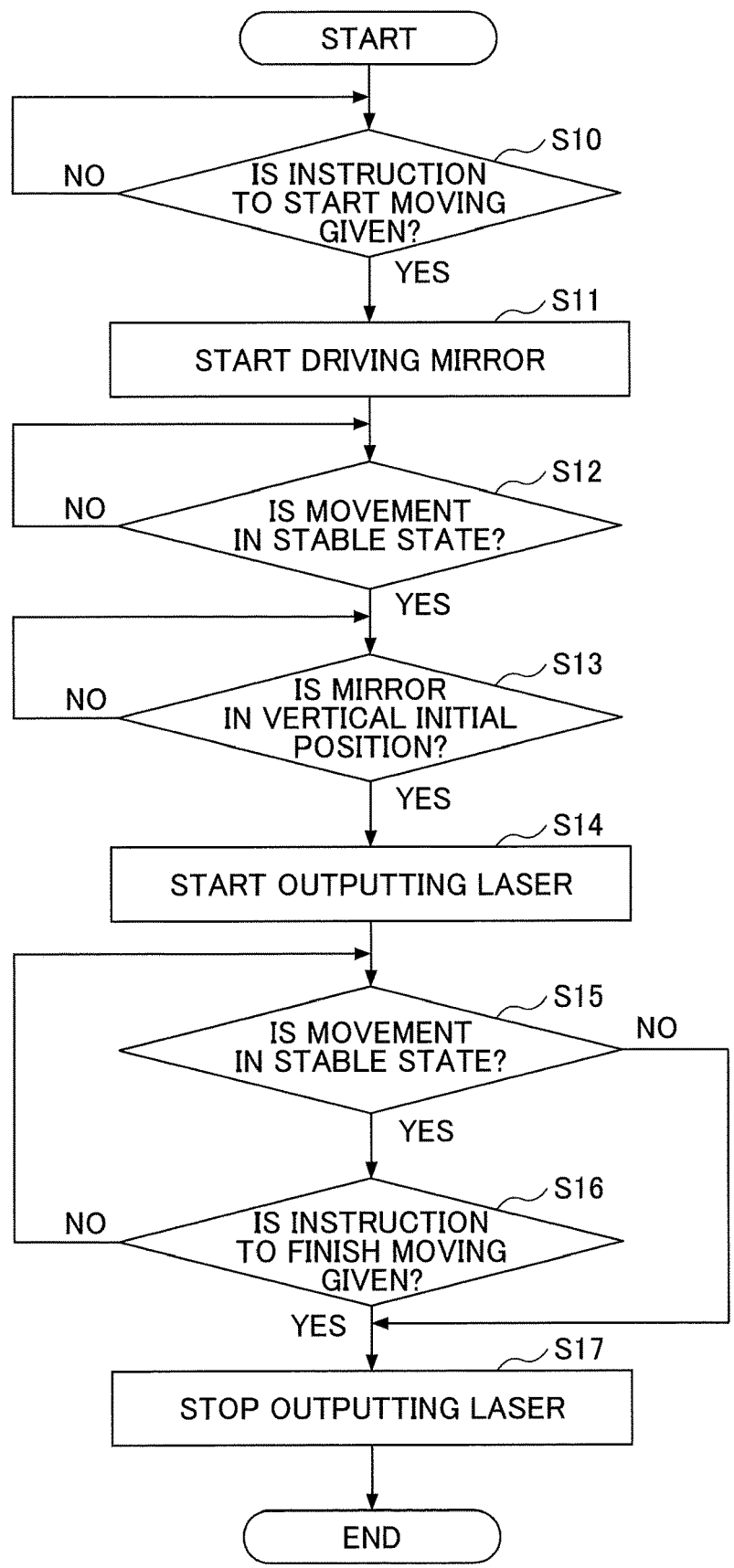
FIG. 12 is a flowchart illustrating an example of a laser output control.

FIG. 12 is a flowchart illustrating an example of a laser output control based on a determined result at the drive-state determining unit 16. In step S10, the system controller 11 determines whether an instruction to be powered on or start moving is given through an operation unit that is not illustrated. When such an instruction is determined to be given (YES in step S10), the process proceeds to step S11.

In step S11, the system controller 11 supplies a horizontal drive signal and a vertical drive signal to the light scanning unit 40, through the mirror drive circuit 13, and starts driving the mirror 110 horizontally and vertically. In step S12, the system controller 11 determines whether the mirror 110 is stably moving based on a determined result at the drive-state determining unit 16. Specifically, the system controller 11 determines that the mirror 110 is stably moving (YES in step S12), when all of determined results at the horizontal deflection-angle determining unit 51; the resonance determining unit 52; the change-rate determining unit 61; the vertical deflection-angle determining unit 62; and the unwanted resonant-component determining unit 63, are normal. In contrast, the system controller 11 determines that the mirror 110 is not stably moving (NO in step S12), when at least one from among determined results at the horizontal deflection-angle determining unit 51; the resonance determining unit 52, the change-rate determining unit 61; the vertical deflection-angle determining unit 62; and the unwanted resonant-component determining unit 63, is not normal.

The system controller 11 repeatedly makes determination until the mirror 110 is stably moved. When the mirror 110 is stably moved, the process proceeds to step S13. In step S13, the system controller 11 determines whether the mirror 110 is in an initial position (vertical initial position) with respect to a vertical scanning direction. The system controller 11 repeatedly makes determination for a vertical initial position. The process then proceeds to step S14 when the mirror 110 is in a vertical initial position (YES in step S13). Note that the determination for a vertical initial position in step S13 may be skipped.

In step S14, the system controller 11 supplies a laser drive signal to the light source 20, through the laser drive circuit 14, and causes the light source 20 to start outputting laser light. The system controller 11 also determines whether the mirror 110 is stably moving after laser light is output (step S15). The determination process in step S15 is the same as that in step S12.

When the system controller 11 determines that all of determined results at the horizontal deflection-angle determining unit 51; the resonance determining unit 52, the change-rate determining unit 61; the vertical deflection-angle determining unit 62; and the unwanted resonance-component determining unit 63, are normal (movement is in a stable state) (YES in step S15), the process proceeds to step S16. In step S16, the system controller 11 determines whether an instruction to be powered off or finish moving is given through an operation unit that is not illustrated. When such an instruction is determined not to be given (NO in step S16), the process returns to step S15. In contrast, when such an instruction to be powered off or finish moving is determined to be given (YES in step S16), the process proceeds to step S17.

In step S15, when the system controller 11 determines that at least one from among determined results at the horizontal deflection-angle determining unit 51; the resonance determining unit 52; the change-rate determining unit 61; the vertical deflection-angle determining unit 62; and the unwanted resonance-component determining unit 63, is not normal (movement is not in a stable state) (NO in step S15), the process proceeds to step S17.

In step S17, the system controller 11 causes the light source 20 to stop outputting laser light, through the laser drive circuit 14.

As described above, with respect to the light scanning apparatus 1 according to the present embodiment, laser light is prevented from being outputted in a state of the mirror 110 not being moving stably. For example, if the mirror 110 is not moving or is oriented at a small deflection angle, due to a failure or the like, in a case of laser light being output, laser light with a light scanning apparatus might result in spot irradiation in which irradiated laser light is concentrated in a narrow area. However, according to the light scanning apparatus 1, laser light is output in a state of the mirror 110 being moving stably, thereby avoiding the issue described above.

Further, the light scanning apparatus 1 determines whether the mirror 110 is stably moving after laser light is output. When the mirror 110 is determined not to be stably moving, output of laser light is stopped. Thereby, after laser light is output, the issue described above can also be avoided.

Further, for non-resonant driving of the mirror 110 in the vertical direction, the light scanning apparatus 1 determines a movement state based on a change rate R of a movement waveform of the mirror 110 in the vertical direction, the change rate being used as one factor in determining a movement state. A waveform data for one drive cycle T (e.g., 16.67 ms, where a drive frequency is 60 Hz) is required to estimate a deflection angle φ with respect to the vertical direction. Although a time is taken to estimate a deflection angle φ, a change rate R can be calculated in a short time. Thus, by using a change rate R in determining of a movement state of the mirror 110, in a case where the mirror 110 is stopped or the like due to a failure, it is possible to detect the failure in a short time to stop outputting laser. Accordingly, safety can be promoted.

In the light scanning apparatus, when there is a difference between a drive frequency at which the mirror is stably moved and an initial value that conveys a drive frequency at which a mirror is started, searching is performed to find a transiently optimum drive frequency. In searching, a drive frequency varies and thus variation occurs in the deflection angle of the mirror with respect to the horizontal direction. In this case, a ratio (aspect ratio) of deflection angles at which the mirror 110 is oriented with respect to the horizontal direction and the vertical direction, might be out of a range of specifications, until the mirror 110 is stably moved. Additionally, when a horizontal drive frequency is varied, a phase shift with respect to the horizontal direction is varied accordingly. For this reason, before movement of the mirror is stabilized, a low quality image that is blurred due to a phase shift might be output from a light scanning apparatus. Also, before an unwanted resonance with respect to the vertical direction is attenuated, a low quality image having crude density (ringing) might be output. In the present embodiment, the light scanning apparatus 1 does not output laser light until the mirror 110 is stably moved. Thereby, a low quality image can be prevented from being output.

Note that in the above embodiments, the horizontal drive-state determining unit 50 includes a horizontal deflection-angle determining unit 51 and a resonance determining unit 52; and the vertical drive-state determining unit 60 includes a change-rate determining unit 61, a deflection-angle determining unit 62, and an unwanted resonance-component determining unit 63. However, the horizontal drive-state determining unit 50 may include at least one unit being the horizontal deflection-angle determining unit 51; and the vertical drive-state determining unit 60 may include at least one unit being the change-rate determining unit 61.

One or more embodiments have been described above, and the present disclosure is not limited to aspects described in the embodiments. Modifications can be made within a scope of the present disclosure. Various aspects can be taken in accordance with an application of a given light scanning apparatus.

What is claimed is:

1. A light scanning apparatus comprising:
    a light source configured to output laser light;
    a mirror configured to reflect the laser light from the light source;
    a mirror driving unit configured to resonantly drive the mirror in a first direction; and non-resonantly drive the mirror in a second direction, the second direction being perpendicular to the first direction;
    a first sensor configured to output a signal in accordance with a first deflection angle at which the mirror is oriented with respect to the first direction;
    a second sensor configured to output a signal in accordance with a second deflection angle at which the mirror is oriented with respect to the second direction;
    a first deflection-angle determining unit configured to estimate the first deflection angle based on an output signal of the first sensor; and
    determine whether the first deflection angle is in a predetermined range;
    a change-rate determining unit configured to calculate a change rate of an output signal of the second sensor; and determine whether the change rate is in a predetermined range; and
    a laser output controller configured to control output of the laser light from the light source, based on a result determined by the first deflection-angle determining unit and the change-rate determining unit.

2. The light scanning apparatus according to claim 1, wherein the laser output control is configured to cause the light source to start outputting laser light, in response to determining, by the first deflection-angle determining unit, that the first deflection angle is in a predetermined range and determining, by the change-rate determining unit, that the change rate is in a predetermined range.

3. The light scanning apparatus according to claim 1, wherein the laser output control is configured to cause the light source to stop outputting laser light, in response to determining, by the change-rate determining unit, that the change rate is not in a predetermined range.

4. The light scanning apparatus according to claim 1, further comprising a resonance determining unit configured to determine whether the mirror resonates with respect to the first direction, based on the output signal of the first sensor;
   a second deflection-angle determining unit configured to estimate the second deflection angle at which the mirror is oriented with respect to the second direction, based on an output signal of the second sensor; and determine whether the second deflection angle is in a predetermined range; and
   an unwanted resonant-component determining unit configured to extract an unwanted resonant component based on the output signal of the second sensor; and determine whether the extracted unwanted resonant component is smaller than or equal to a predetermined value,
   wherein the laser output controller is configured to control the output of the laser light from the light source, based on results determined by the first deflection-angle determining unit; the change-rate determining unit; the resonance determining unit; the second deflection-angle determining unit; and the unwanted resonant-component determining unit.

5. A method for controlling a light scanning apparatus, the method comprising:
   estimating a first deflection angle based on an output signal of a first sensor of the light scanning apparatus, the light scanning apparatus including:
      a light source configured to output laser light; and
      a mirror configured to reflect the laser light from the light source; and
      a mirror driving unit configured to resonantly drive the mirror in a first direction; and non-resonantly drive the mirror in a second direction, the second direction being perpendicular to the first direction; and
      the first sensor configured to output a signal in accordance with the first deflection angle at which the mirror is oriented with respect to the first direction; and
      a second sensor configured to output a signal in accordance with a second deflection angle at which the mirror is oriented with respect to the second direction; and
   first determining whether the first deflection angle is in a predetermined range;
   calculating a change rate of an output signal of the second sensor;
   second determining whether the change rate is in a predetermined range; and
   controlling output of the laser light from the light source, based on a result determined in the first determining and the second determining.

6. The method according to claim 5, wherein the controlling includes causing the light source to start outputting laser light, in response to determining, in the first determining, that the first deflection angle is in a predetermined range and determining, in the second determining, that the change rate is in a predetermined range.

7. The method according to claim 5, wherein the controlling includes causing the light source to stop outputting laser light, in response to determining, in the second determining, that the change rate is not in a predetermined range.

* * * * *